July 1, 1930.  M. J. MANESS  1,769,525
CULINARY ARTICLE
Filed Dec. 26, 1928

Maggie J. Maness,
INVENTOR
BY Victor J. Evans
ATTORNEY

Patented July 1, 1930

1,769,525

UNITED STATES PATENT OFFICE

MAGGIE JOHNSON MANESS, OF ROME, GEORGIA

CULINARY ARTICLE

Application filed December 26, 1928. Serial No. 328,529.

This invention relates to improvements in culinary articles, an object being to provide a combined cutter and mixer which is especially adapted for use in preparing material for salads and sandwiches.

Another object of the invention is the provision of an article of the above character which is simple in construction, easy to use and by means of which the material may be cut and thoroughly mixed in a relatively short time.

With the above and other objects in view the invention further includes the following novel features and details of construction, to be hereinafter more fully described, illustrated in the accompanying drawings and pointed out in the appended claim.

In the drawings:—

Figure 1:
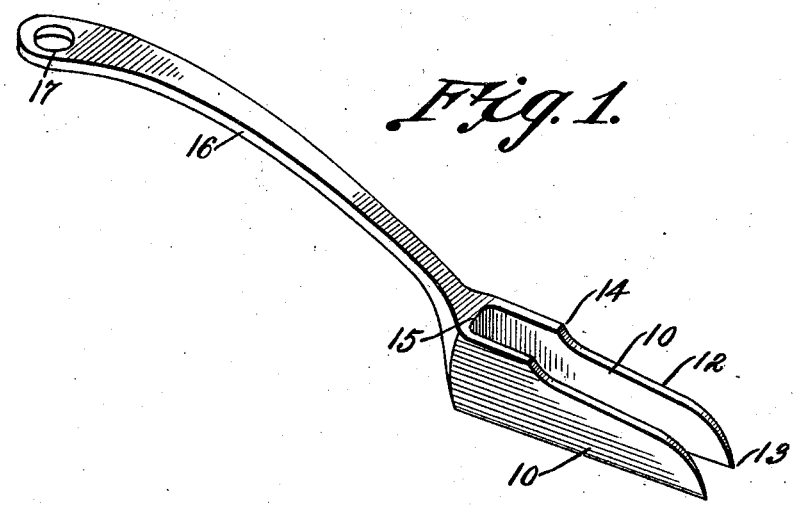
Figure 1 is a perspective view of the invention.
Figure 2:
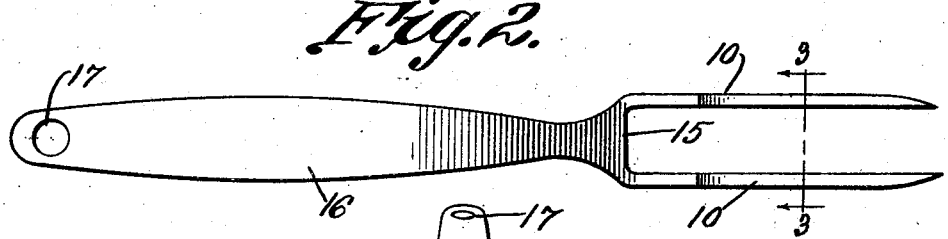
Figure 2 is a plan view.
Figure 3:
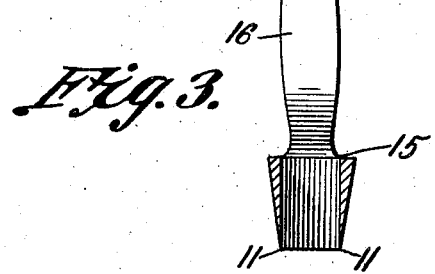
Figure 3 is a section on the line 3—3 of Figure 2.

Referring to the drawings in detail wherein like characters of reference denote corresponding parts, the invention which is shaped somewhat after the manner of a fork, includes a number of tines or blades 10. Two or more blades may be employed and the lower edges of these blades are shaped to provide straight cutting edges 11. It is preferred to shape the blades cross sectionally as shown in Figure 3 of the drawing so as to provide these cutting edges. The upper edges of the blades are blunt and curved as shown at 12 so that their outer ends provide penetrating points 13, while shoulders 14 are provided at the inner ends of the curved portions of the blades. The rear or inner ends of the blades are connected as at 15 and have extending therefrom a relatively long handle 16. This handle extends rearwardly at an incline with respect to the blades and is provided with an opening 17 by means of which the article may be hung from a convenient point.

The invention is especially useful for cutting material for salads and sandwiches, the pointed ends of the blades being forced in the material whereupon the curved upper edges 12 will force the cutting edges 11 through the material for an initial cut. The blades may then be used after the manner of a chopping instrument, the material being picked up and mixed during the chopping operation so that all of the material will be effectually cut.

The invention is susceptible of various changes in its form, proportions and minor details of construction and the right is herein reserved to make such changes as properly fall within the scope of the appended claim.

Having described the invention what is claimed is:

A combined cutter and mixer of the class described comprising a pair of spaced blades having straight lower cutting edges, the upper edges of the blades being blunt and upwardly and rearwardly curved and extending rearwardly from the forward ends of the cutting edges, the blades being tapered at their outer ends to provide a penetrating point and a handle supporting the blades and extending rearwardly therefrom, the blunt, curved upper edges of the blades serving to effect downward movement of the lower cutting edges of the blades when the blades are inserted endwise in material to be cut.

In testimony whereof I affix my signature.

Mrs. MAGGIE JOHNSON MANESS.